Dec. 11, 1956 T. G. SCHEITLIN 2,773,362
REFRIGERATORS FOR FREEZING FOOD AND STORAGE OF FROZEN FOOD
Filed May 18, 1953 7 Sheets-Sheet 1
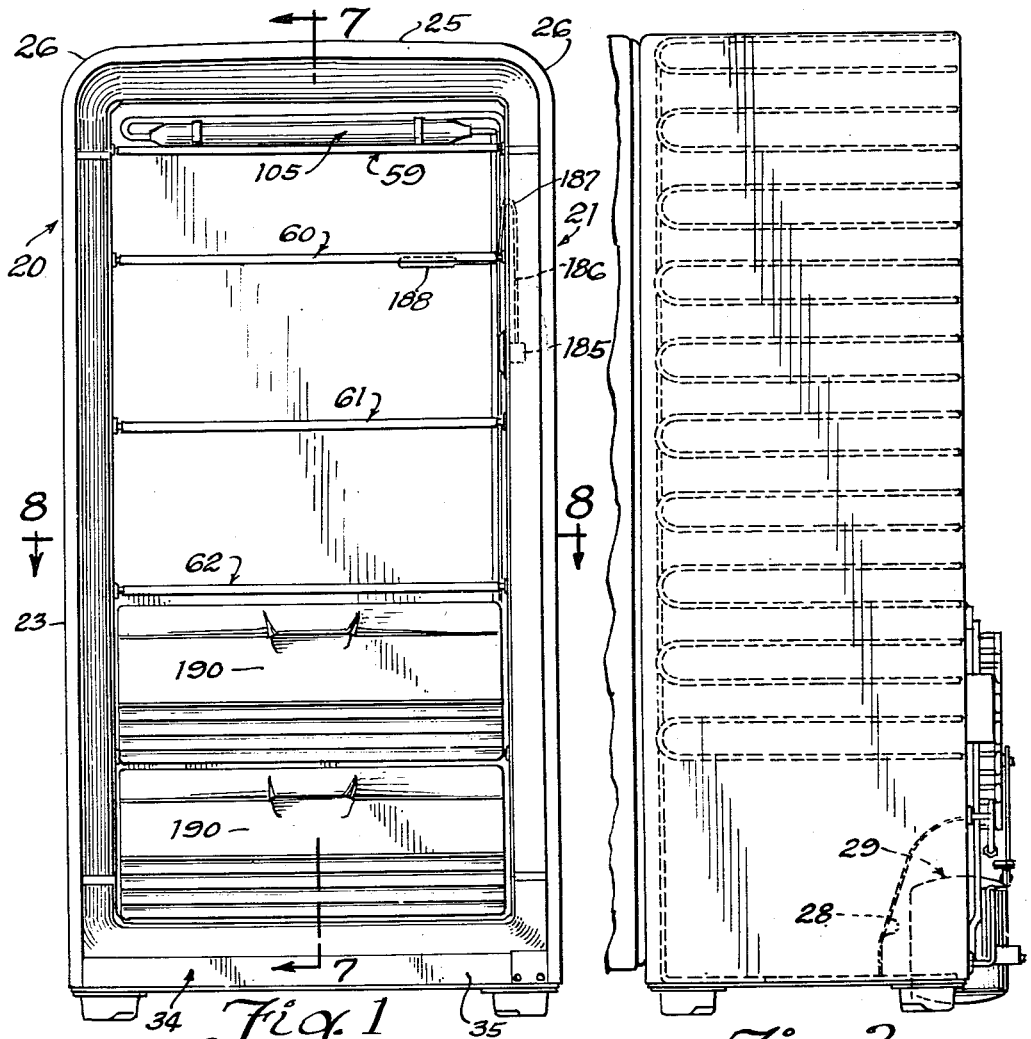
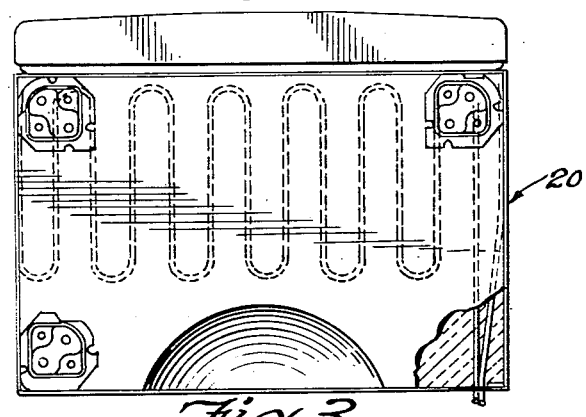
INVENTOR.
Thomas G. Scheitlin
BY Robert H. Wendt
Att'y Dec. 11, 1956 T. G. SCHEITLIN 2,773,362
REFRIGERATORS FOR FREEZING FOOD AND STORAGE OF FROZEN FOOD
Filed May 18, 1953 7 Sheets-Sheet 2

INVENTOR.
Thomas G. Scheitlin
BY
Robert H. Wendt
Atty

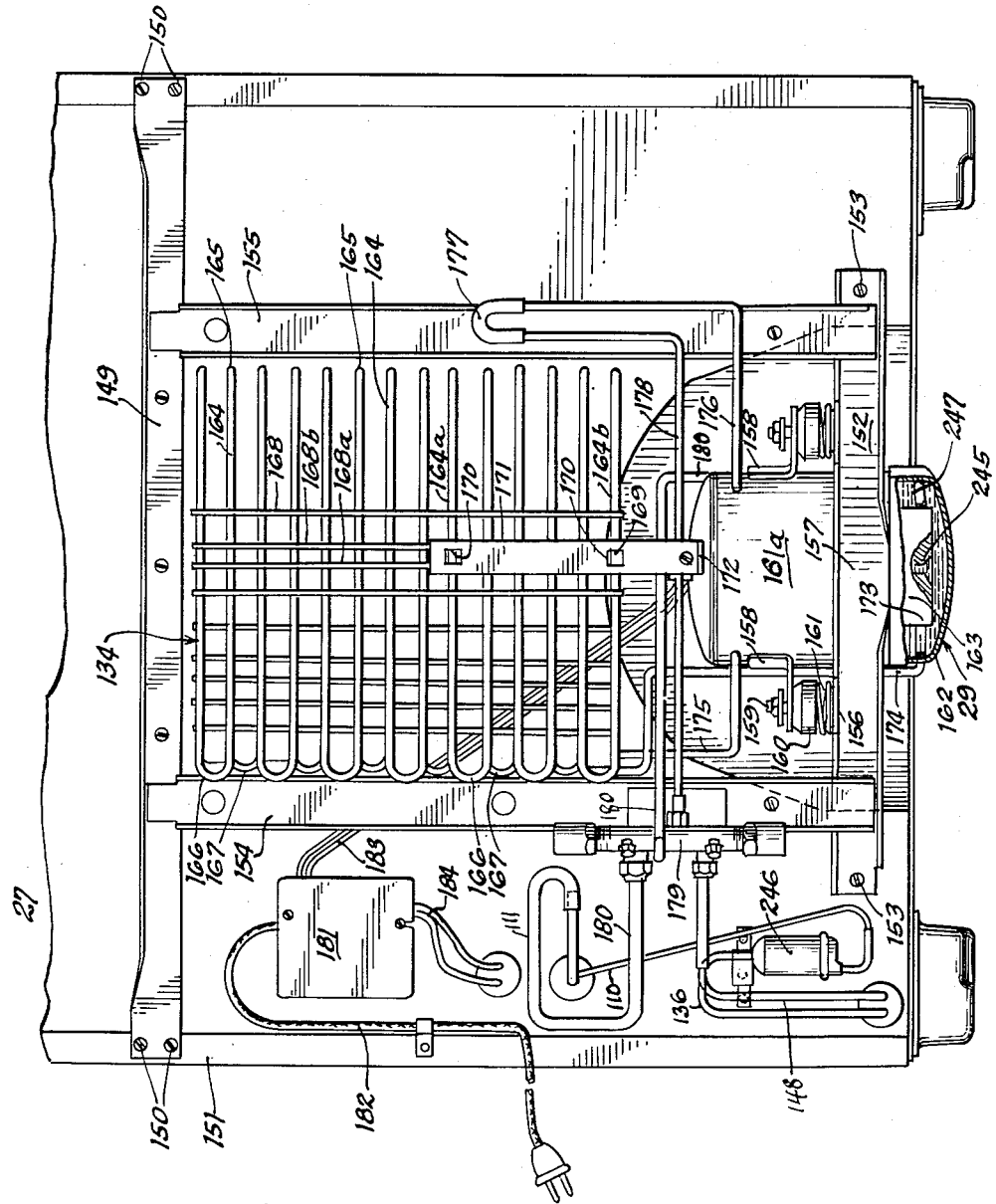

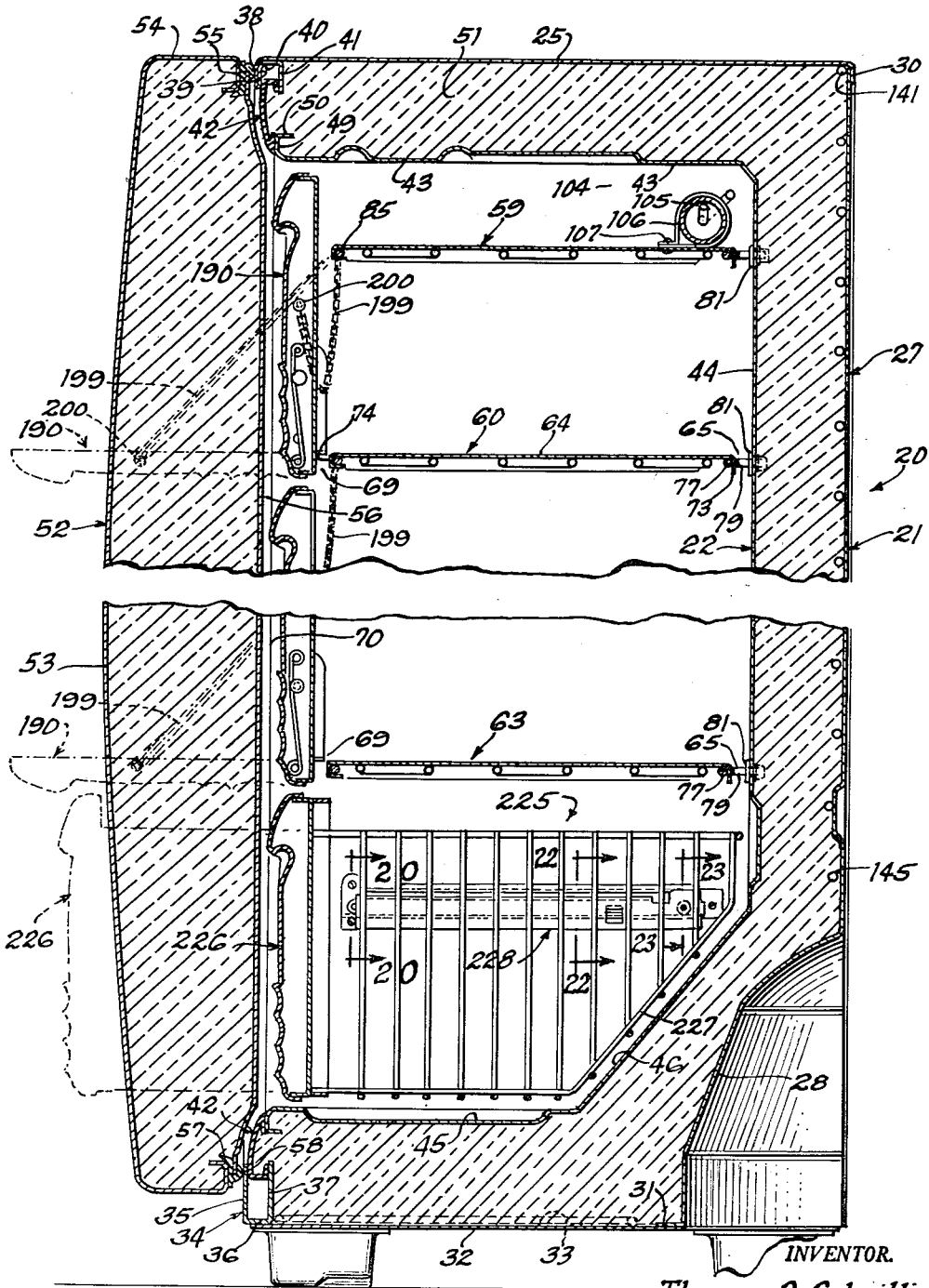

Dec. 11, 1956 T. G. SCHEITLIN 2,773,362
REFRIGERATORS FOR FREEZING FOOD AND STORAGE OF FROZEN FOOD
Filed May 18, 1953 7 Sheets-Sheet 5
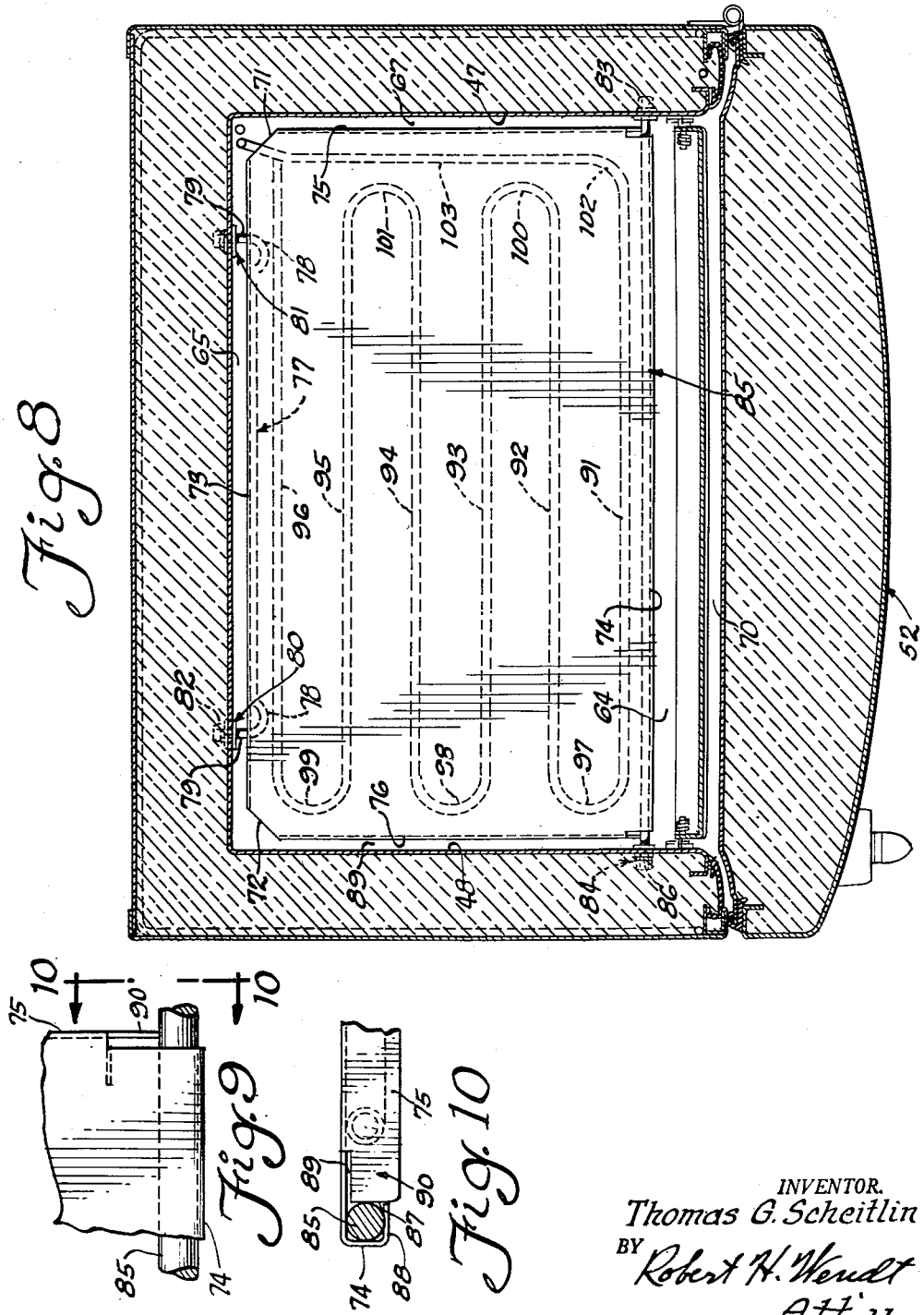
INVENTOR.
Thomas G. Scheitlin
BY Robert H. Wendt
Att'y Dec. 11, 1956 T. G. SCHEITLIN 2,773,362
REFRIGERATORS FOR FREEZING FOOD AND STORAGE OF FROZEN FOOD
Filed May 18, 1953 7 Sheets-Sheet 6
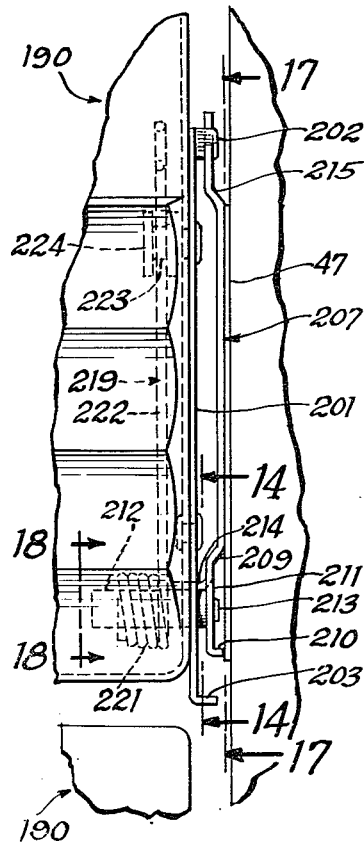
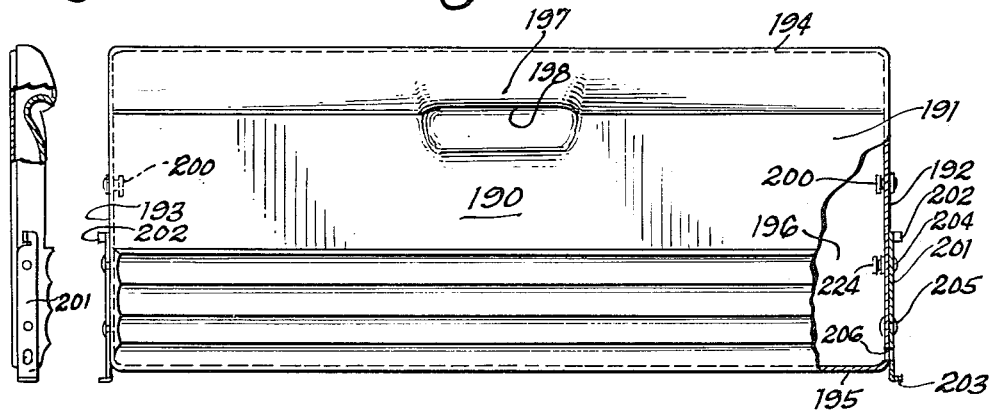
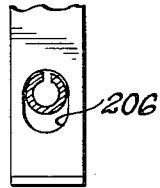
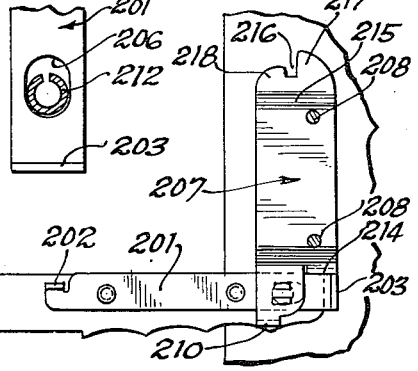
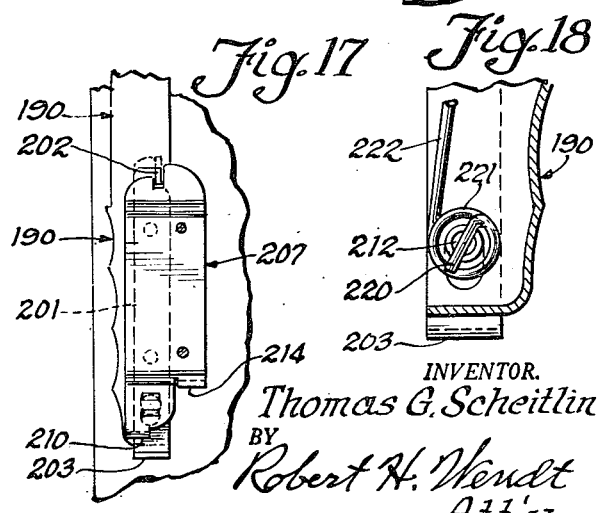
INVENTOR.
Thomas G. Scheitlin
BY
Robert H. Wendt
Att'y

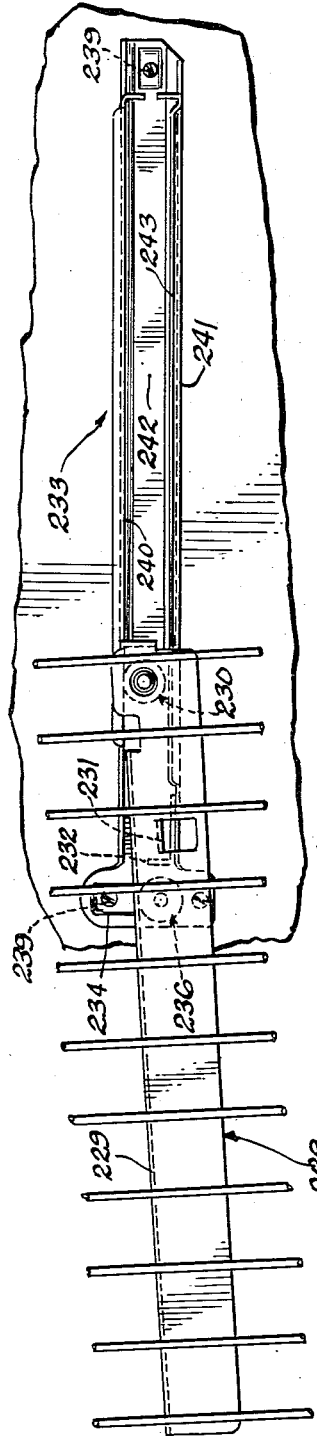
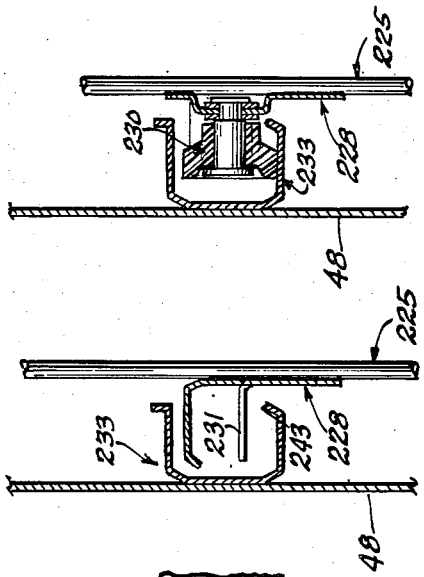
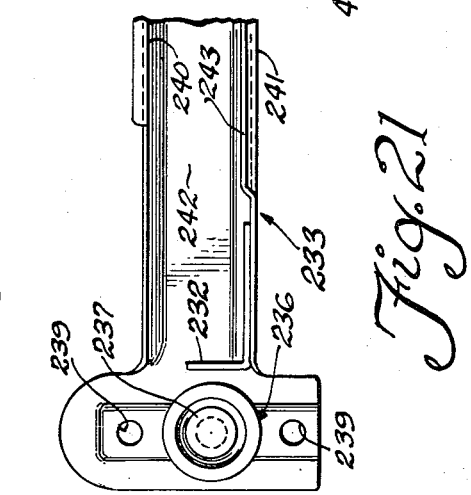
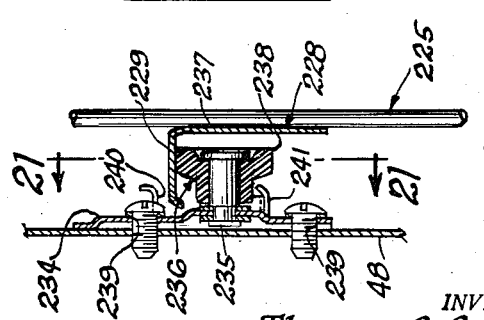

2,773,362

REFRIGERATORS FOR FREEZING FOOD AND STORAGE OF FROZEN FOOD

Thomas G. Scheitlin, Evansville, Ind., assignor, by mesne assignments, to Whirlpool-Seeger Corporation, a corporation of Delaware Application May 18, 1953, Serial No. 355,615

8 Claims. (Cl. 62—117.3)

The present invention relates to refrigerators for freezing food and storage of frozen food, and is particularly concerned with that type of freezer having a vertical door opening and a vertical door.

One of the objects of the invention is the provision of an improved refrigerator construction which is simple, economical to manufacture, and adapted to provide below zero temperatures in all of a plurality of different compartments, and to maintain these temperatures uniformly at a minimum amount of expense.

Another object of the invention is the provision of an improved shelf construction and shelf support by means of which the shelves are removably supported in the cabinet, and which involves a minimum amount of labor in their manufacture and installation.

Another object of the invention is the provision of an improved door structure for freezing shelf spaces, by means of which the door may be supported in horizontal position when open and held in vertical position when closed.

Another object of the invention is the provision of an improved refrigeration system utilizing the outer shell of the cabinet as the extended surface for the condenser coils, and also provided with an auxiliary precooling condenser by means of which the compressed refrigerant is immediately cooled after it is taken from the compressor and returned to the motor housing in condition to effect a cooling of the motor.

Another object of the invention is the provision of an improved refrigeration system in which the cooling effect is provided by below-freezing and below-zero shelves, and in which the heat is dissipated from the entire outside of the cabinet shell.

Another object of the invention is the provision of an arrangement of main condenser coils on the inside of the outer metal shell of a refrigerator cabinet in such manner that sweating or condensation on the outside of the cabinet is substantially eliminated.

Other objects and advantages of the invention will be apparent from the following description and the accompanying drawings, in which similar characters of reference indicate similar parts throughout the several views.

Referring to the seven sheets of drawings,

Fig. 1 is a front elevational view of a freezer with the outside door omitted and the three upper inner doors omitted;

Fig. 2 is a side elevational view, taken from the right side of Fig. 1, and showing the arrangement of condenser coils on that side of the shell;

Fig. 3 is a bottom plan view, taken from the bottom of Fig. 1, with the motor compressor and pre-cooler condenser omitted, showing the arrangement of the main condenser coils on the bottom panel of the shell;

Fig. 6 is a fragmentary rear elevational view of the bottom rear of the refrigerator, showing the pre-cooling condenser, motor compressor, and associated parts carried by the back panel;

Fig. 7 is a fragmentary vertical sectional view of the cabinet of Fig. 1, with the motor compressor and precooling condenser omitted, and broken away to omit identical portions of the cabinet;

Fig. 8 is a horizontal sectional view, taken on the plane of the line 8—8 of Fig. 1, with the door added;

Fig. 9 is a fragmentary sectional view, showing one corner of a shelf with its support and with the retaining tab bent into position to secure the shelf;

Fig. 10 is a fragmentary sectional view, taken on the plane of the line 10—10 of Fig. 9;

Fig. 11 is a front elevational view of one of the inner doors, partially broken away to show its structure;

Fig. 12 is a side elevational view of the door of Fig. 11, taken from the left of Fig. 11;

Fig. 13 is a fragmentary elevational view of the hinge and spring arrangements at one end of the inner door;

Fig. 14 is a fragmentary sectional view, taken on the plane of the line 14—14 of Fig. 13, when the parts are in the dotted line position of Fig. 17, with the inner door lifted to release it for opening;

Fig. 15 is a view similar to Fig. 14, showing the position of the door trunnions and bearings after the door has been closed and dropped into the full line position of Fig. 17;

Fig. 16 is a fragmentary side elevational view, showing the position of the hinge arrangements for the door, with the door in open position;

Fig. 17 is a fragmentary elevational view, taken on the plane of the line 17—17 of Fig. 13, looking in the direction of the arrows, and showing the position of the parts when the door is in closed position, in full lines, and the position in dotted lines when the door has been lifted to release the door from being locked in closed position;

Fig. 18 is a fragmentary sectional view, taken on the plane of the line 18—18 of Fig. 13, looking in the direction of the arrows;

Fig. 19 is a fragmentary side elevational view of the drawer guides with the drawer in the open position;

Fig. 20 is a fragmentary sectional view taken on the axis of the roller 236;

Fig. 21 is a fragmentary elevational view of the outer end portion of a drawer guide taken on the plane of line 21—21 of Fig. 20;

Fig. 22 is a fragmentary sectional view taken through the drawer guides;

Fig. 23 is a fragmentary sectional view taken on the plane of the axis of the rear roller.

Figure 4:
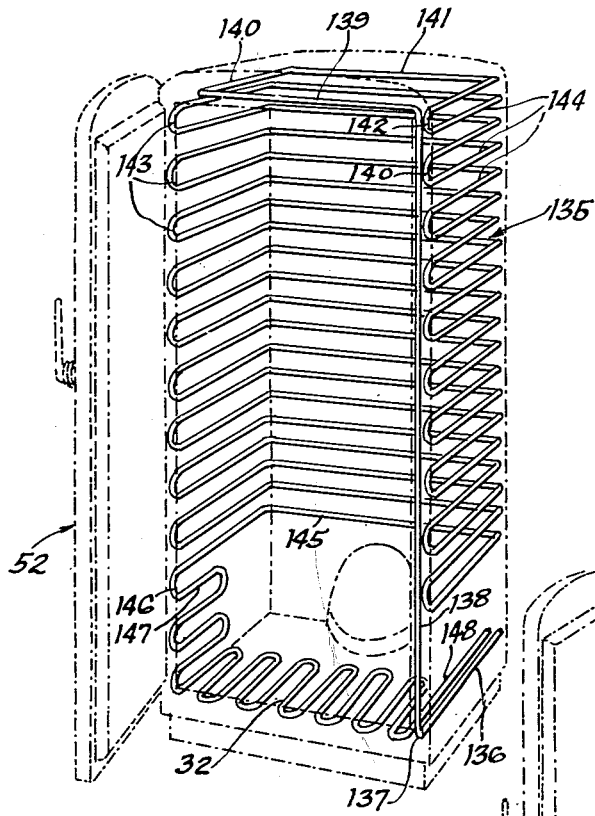
Fig. 4 is a view in perspective of the cabinet, showing the cabinet in dotted lines, and the main condenser coils which are carried by the outer shell in full lines.

Referring to Figs. 1–3 and 7, 20 indicates in its entirety the cabinet of the refrigerator, which includes an outer metal shell 21 and an inner liner 22, both being of boxlike form and provided with a door opening. Thus the outer shell 21 may have its sides and top formed of a single sheet, including the side wall 23, other side wall 24, and top wall 25 joined to the side walls by easy bends at 26.

The back of the shell is closed by a back panel 27 of substantially rectangular shape, which is provided with an inward bulge at 28 for partially housing the motor compressor 29. The back panel is secured to the side wall unit by means of attaching flanges 30, which extend along the rear edge of the side walls 23, 24, and top wall 25.

At the bottom the rear panel 27 has an attaching flange 31 for securement to the bottom panel 32. The side walls 23 and 24 have inwardly extending foot flanges 33 secured to the bottom panel 32; and a transverse bottom rail 34 is provided which is of channel shape and provided with a face flange 35, an attaching yoke 36, and an inner flange 37.

The side wall and top unit 23–25 has its door opening edge provided with a face flange 38 and is bent back upon itself to provide a flange 39 and bent at right angles to provide a reinforcing flange 40. It is also bent inwardly at 41 to form a channelled recess all around the door opening similar in transverse dimension to the bottom rail 34 for housing the breaker strips 42.

The liner 22 is box-like in shape, including a top wall 43, a rear wall 44, a bottom panel 45, a diagonal portion 46 joining the rear wall and bottom wall and the two side walls 47, 48. The liner has a forward door opening in substantial alignment with the door opening of the shell 21; but the liner terminates at a facing flange 49, which is turned outwardly and then turned backwardly at 50; and both of these flanges are slightly back of the facing flange 38.

The liner is supported from the shell by suitable heat insulated corner brackets and additional insulated supporting members extending from the front of the liner to the front of the shell; and the space between the liner and shell is filled with blocks of insulation 51 suitably shaped to fit the spaces in which they are to be placed.

The open edge between the liner 22 and the shell 21 is closed by the breaker strips 42 slidably mounted in the recess formed by flanges 39–41 and held by spring clips to the liner flanges 49, 50.

The cabinet 20 is closed by an insulated door 52, which may comprise an outer metal panel 53 having an inwardly extending border flange 54 and an attaching flange 55. The door also includes an inner panel 56 overlapping the attaching flange 55 and received in a groove in a resilient rubber sealing strip 57, which is clamped between the panels 53 and 56 and has a hollow rounded portion 58 engaging the face flanges 35 and 38 of the shell to effect an air-tight closure.

Figure 5:
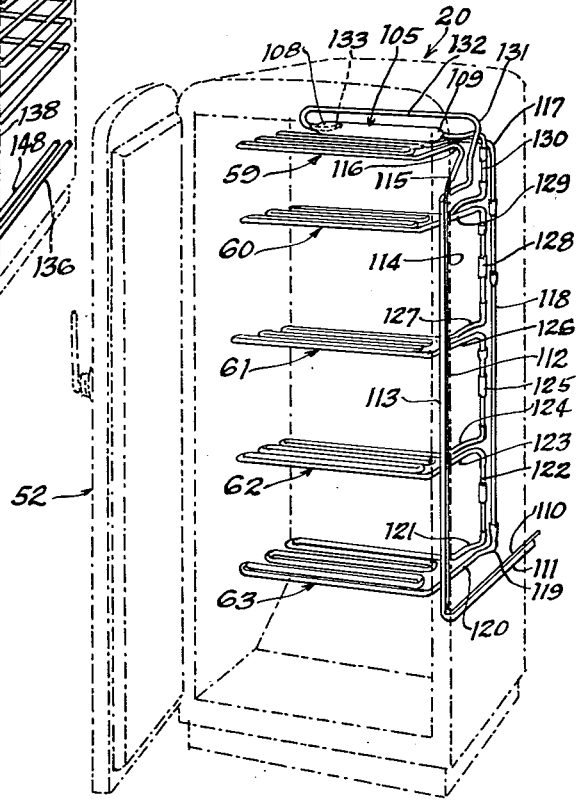
Fig. 5 is a similar view in perspective, showing the freezing shelf coils arranged in their proper position inside the cabinet.

The interior of the cabinet is provided with a plurality of freezing shelves, all of which are shown diagrammatically in Fig. 5 and indicated by the numerals 59–63.

Referring to Fig. 7, in which part of the cabinet is broken away, only the two uppermost shelves 59, 60 and the lowermost 63 appear in this view; but the other shelves 61 and 62 are identical in construction to shelves 60 and 63. Each of the shelves 60–63 consists of a rectangular plate 64 of suitable sheet metal, such as aluminum, of sufficient size to be received inside the liner with an air space 65 behind each shelf inside the liner, and air spaces 67 and 68 at each side of the shelf.

There is also an air space 69 in front of each shelf behind the doors, and an air space 70 between the inner door panel and the doors. Each shelf plate may have its rear corners beveled at 71 and 72 to provide additional air space and to provide space for conduits.

Each shelf plate is bordered at the rear by a depending reinforcing flange 73 at the front, by a face flange 74, and at the two sides by the border flanges 75 and 76. The depth of these flanges is slightly more than the diametrical dimension of the tubing and larger than the rods employed for supporting the shelf.

Each shelf is provided along its rear edge with a cylindrical supporting rod 77 having a central straight portion and having an inwardly extending U bend 78 at each end, terminating in an outwardly extending supporting leg 79. The length of the supporting legs 79 is sufficient to traverse the air space 65 and to extend into and to strike the base of a cylindrical bore in the resilient rubber or plastic grommets 80, 81.

The liner is provided with apertures for the grommets 80, 81, which are grooved to receive the edges of the liner about the apertures; and the grommets are tapered at 82 beyond the liner so that they may be pressed into the liner apertures until their grooved portions engage the liner about the apertures.

The U bends at 78 permit the rod 77 to have a clearance with the shelf flange 73 at each end of the straight portion so that the straight portion of each rod 77 may engage throughout its full length against the shelf flange 73 to which it is welded or brazed.

The grommets 80, 81 are preferably located in the rear wall of the liner, widely spaced from each other, near the corners of the shelf.

The liner is also provided with a pair of resilient grommets 83, 84 located in the apertures in the liner in the side walls 47, 48 forwardly near the door opening and just behind the front flange 74 of the shelf.

A straight rod 85 is of sufficient size to extend into both grommets 83, 84; and it is installed by inserting one end in one grommet and stretching the grommet by pushing on the rod until the other end of the rod clears the other grommet, into which it is inserted. The grommets then revert to their original length and hold the rod by engaging the bottom of each grommet bore 86.

The side flanges 75 are each cut away at their forward ends as indicated at 87 (Fig. 10), leaving a space between the end 87 of each side flange 75 or 76 and the front flange 74 sufficient in size to receive the rod 85.

The front flange 74 is bent backwardly, providing a retaining flange 88 below the rod 85.

The side flanges 75 and 76 are provided with slits 89 at the top, thus forming separate tabs 90, which can be bent inwardly, as shown in dotted lines in Fig. 9, and bent out again to the full line position, as shown in Figs. 9 and 10.

When the parts are arranged as shown in Fig. 10, the front of the shelf is definitely locked on the rod 85; and all of the shelves are constructed in the same way.

Each shelf is provided with sinuously arranged freezing coils which include a plurality of side to side passes 91–96 joined by a plurality of easy bends 97–99 on the left (Fig. 8) and by a plurality of easy bends 100–101 on the right.

The last or rear pass 96 preferably terminates at the right rear corner; and the forward pass 91 is bent at right angles at 102 and has a straight backwardly extending portion 103 between the U bends 100, 101 and the side flange 75. The front and rear passes 91 and 96 are preferably located as close as possible to the front and rear edges of the freezing plate.

Referring to Fig. 5, this is a diagrammatic illustration showing the cabinet 20 with its door 52 and the coils of the respective shelves 59–63 connected together in the order in which they are connected in the freezer.

The uppermost shelf 59 differs from the others in being spaced from the top 43 of the liner sufficiently to receive ice trays in the ice tray space 104. The upper shelf 59 is also provided with a relatively large tubular receiver 105 located on its upper side near its rear edge and clamped to the upper shelf 59 by an encircling band 106, the ends of which are brought into overlapping relation at 107 and secured by a rivet.

A plurality of such clamping bands are employed; and the receiver 105 comprises an enlarged tube, which is spun down at 108, 109 at each end and provided with a small tubular formation to be joined to the freezing tubing of the shelves.

The course of the refrigerant through the shelf tubing is preferably as follows: A capillary tube restrictor 110 is brazed or soldered to a suction tube 111, which extends forwardly along the right side of the cabinet inside the shell and extends upwardly at 112, 113 behind the right front breaker strip.

There may be a coil of capillary tubing 114 interposed in the capillary tube between its ends to increase the length of the capillary tubing and give it the necessary amount of restriction. The capillary tubing has its inlet at 115 to the top shelf by means of a bend 116 in the tubing, which extends to the front pass of the top shelf 59. Thereafter the tubing extends sinuously across the top shelf to the rear pass adjacent the receiver 105; and from the rear pass the tubing extends outwardly and is bent downwardly at 117.

The downward tubing 118 extends to the bottom shelf, where it is bent forwardly at 119, and extends forward at 120 to the front pass of the bottom shelf 63. Thereafter the tubing extends sinuously from side to side to the back of the shelf 63, and laterally at 121, and upwardly at 122 to the bottom of shelf 62.

The tubing extends forwardly at 123 to the front pass of shelf 62. Thereafter it extends back and forth sinuously from left to right to the back of the shelf 62, and then laterally at 124 to the right hand corner upwardly at 125 to the next shelf.

Next, the tubing extends forwardly at 126 to the front of shelf 61; and then it proceeds sinuously from left to right to the back of the shelf 61.

The tubing 127 extends laterally to the upwardly extending tubing 128 and forwardly at 129 to the front of shelf 60. Thereafter the tubing extends sinuously from left to right under shelf 60 to the rear of the shelf, which is connected by tubing 130, which extends laterally and upwardly, and again laterally to the end 109 of receiver 105.

The suction tube 111 extends upwardly at 113 and rearwardly to 131. Then it extends laterally across the back of the cabinet at 132, and is provided with a U turn, connecting it to the end 108 of receiver 105. The suction tube is turned upwardly at 133 inside the receiver 105 so that its upwardly open end is spaced from any liquid in the receiver; and the suction tube draws vapor from the receiver 105.

The refrigeration system includes a preliminary condenser, indicated in its entirety at 134, and a main condenser, indicated in its entirety in Fig. 4 by the numeral 135. The main condenser utilizes the external metal shell 21 as the extended metallic radiating surface for the main condenser; and the tubing is arranged on the inside of the shell 21, as shown in Fig. 4.

The motor compressor being located at the rear, in the cavity 28, the tubing extends forwardly at 136 from the rear, and is bent at right angles at 137 immediately behind the right breaker strip. The tubing extends upwardly at 138 to the top of the cabinet and extends laterally at 139 across the top of the cabinet behind the top breaker strip.

It extends backwardly at 140 under the top 25 of the shell and laterally at 141 under the top of the shell near the rear edge to the right side of the shell. Thereafter the condenser tubing includes a multiplicity of horizontal passes of tubing joined by U shaped bends 142 on the right and 143 on the left; and these U shaped bends extend forwardly as far as possible behind the front breaker strip.

This arrangement of the U-shaped bends and the distribution of the coils is such that the outer shell is uniformly heated and sweating or condensation on the outer shell is substantially eliminated.

Each horizontal pass, indicated by the number 144, extends across the left side, across the back, and across the right side; and the horizontal passes beginning at the conduit 141 may be substantially parallel from the right U-bend 140 to the left U-bend 143, and back again from the left U-bend 143 to the next right U-bend 140.

Thus the refrigerant, which enters the condenser in the form of a hot gas, under high pressure and temperature, goes immediately to the top of the condenser tubing so that any refrigerant which condenses to liquid tends to run down to the bottom of the condenser tubing.

The last or lowermost horizontal pass 145 extends forwardly to a U-bend 146 and communicates with a plurality of short horizontal passes 147, which still slope constantly downward and extend down the left side of the shell and across, above the bottom panel 32 of the shell, terminating in a rearwardly extending pass 148 in Fig. 4, which represents the outlet from the main condenser 135.

It will thus be observed that hot gas is carried to the front of the shell by the tubing of the condenser 135 to raise the temperature of the shell around the bottom rail, side and top breaker strips above the dew point to eliminate condensation on the outside of the cabinet.

Referring to Figs. 2 and 6, these show the side elevation and rear elevation of those parts of the cabinet bearing the motor compressor, preliminary cooling condenser, drier, connection boxes, etc.

The rear of the cabinet is provided with a transverse metal frame member 149 above the preliminary cooling condenser 134, extending from side to side, and attached by screw bolts 150 to the attaching flanges 151, carried by side walls, and secured to the back panel 27.

A second transverse frame member 152 extends across the lower part of the cavity 28 in the back panel and is secured to the back panel by screw bolts at 153. Two vertically extending channelled frame members 154 and 155 extend parallel to each other, being secured at their upper ends by welding to the frame member 149 and at their lower ends to the frame member 152.

Frame members 149, 152, 154 and 155 reinforce the back panel 27 and provide a unit support for the motor compressor 29 and preliminary cooling condenser 134.

The horizontal frame member 152 is provided with the forwardly extending angle brackets 156, and is bowed out at its middle portion 157 to extend about the motor compressor 29. The motor compressor 29 carries a pair of angle brackets 158, each of which has an aperture for a screw bolt 159 passing through brackets 158 and 156, and supporting a metal cup 160 and a coil spring 161.

In operation the nut on bolt 159 is loosened so that the motor compressor is supported by springs 161 on the diametrically opposed brackets 158. During shipping the nuts on bolts 159 are tightened down until cup 160 engages angle bracket 156, in each case holding the motor compressor rigid.

The motor compressor 29 is provided with a unitary external housing 161a having an upper part surrounding the motor and a lower part 162 surrounding the compressor 163, which is disposed in an oil sump formed by lower housing part 162. The housing parts 161 and 162 are separated only by a supporting frame, which permits the oil to run down from the motor parts in the housing 161 to the oil sump 162.

The preliminary cooling condenser consists of a multiplicity of horizontal passes 164 in front and similar horizontal passes in back joined by U shaped bends 165 at the right of Fig. 6 and by U shaped bends 166 and 167 at the left of Fig. 6. The U shaped bends 165 extend horizontally, while the U shaped bends 166, 167 extend vertically, thus providing two separate front and rear layers of sinuous tubing.

These horizontal passes 164 of tubing are joined by substantially straight metal wires 168, only a few of these being shown, and the wires being preferably regularly spaced and located on both sides of the layers of tubing and integrally welded to each tube over which the wire passes. Aside from the two central wires 168a and 168b, the other wires may be substantially eliminated or reduced in number, as required to dissipate the heat.

The wires 168a and 168b are located on either side of U shaped rubber members 169 which extend about certain horizontal passes 164a and 164b and have their ends located in an aperture 170 in a vertical metal bar 171 carried by an angle bracket 172 fixedly secured to the top of motor compressor housing 161.

Thus the preliminary cooling condenser 134 is spaced solely by resilient rubber U shaped members, which in turn are carried by bar 171 mounted on the motor compressor 29.

The course of the refrigerant in the system is as follows:

The outlet of the compressor 163 is indicated at 173 and is connected to tube 174, which extends through the oil sump 162, but does not communicate with it. Tube 174 extends upwardly to the front horizontal passes of the preliminary cooling condenser 134 at the top thereof and communicates with the uppermost horizontal pass 164 of this condenser on the left side of Fig. 6.

Thereafter the tubing extends to the right in Fig. 6, to the rear of a U bend 165, to the left in a pass 164, downward at a U bend 166. Thereafter the preliminary condenser tubing extends to the right in a rear pass 164, forward at a U bend 165, and to the left in a front pass 164.

In a similar manner the tubing extends sinuously down to the bottom of the preliminary cooling condenser in such manner as to drain toward the bottom so that any partially condensed liquid and entrained oil may run down to the tube 175, which communicates with the interior of the motor housing part 161.

The partially condensed refrigerant and oil run down over the motor parts, the refrigerant re-evaporating, and the oil separating to the oil sump 162. Thereafter the vaporized refrigerant still hot and under pressure emerges from the motor housing 161 through tubing 176, which has a flexible U bend at 177 and a horizontal portion 178 extending to a double valve housing 179 having two separate chambers and valves, not connected with each other. From the valve housing 179 the tubing extends at 136, forwardly in the insulation to the main condenser 135 on inside of shell 21, returning through tube 148 to drier 246. From the drier 246 it passes through capillary 110 to the evaporators 59–63, returning through tube 111 and 180 to compressor inlet 247.

The two separate valves in housing 179, permit separation of the compressor and precooler unit from cabinet containing evaporators and main condenser. Compressor may be charged with Freon and oil and then connected to the dehydrated evaporators and main condenser and the valves are then opened.

181 indicates the housing of a combined thermal overload and motor starting switch connected by the two-conductor cord 182 to the usual 110 volt, 60 cycle lighting circuit. 183 indicates the three conductors connected with the starting and running windings and common conductor of the induction motor. 184 indicates the conductors interposed in the motor circuit and extending to the cold control switch, comprising a thermostatic switch 185 (Fig. 1) of the bellows type for turning the compressor on and off responsive to the temperature of the evaporator shelf 60.

The cold control 185 is adjustable and has a capillary tube extending upwardly at 186 and forming a U bend at 187 and extending to a bulb attached to the lower side of the second shelf 60, which is the last to receive refrigerant of all of the shelves to assure full refrigeration of all of the shelves, since they will all be colder than the last shelf 60.

The bulb 188 is preferably attached to the shelf 60 near the middle of the shelf.

The shelves, except the uppermost one, indicated at 59, are all equally spaced; and the opening in front of each of the shelves, except the lowest one, is preferably closed by a pivoted door 190. The doors may be identical in construction. The lowest space is closed by a drawer.

In some embodiments of the invention the doors may be omitted; but they serve the useful purpose of tending to keep the cold air in place in the space above all of the shelves except the one which happens to be opened.

Each door may comprise a drawn aluminum box-like member 190 (Fig. 11), which has a suitable ornamental front panel 191 bordered by side flanges 192, 193 and upper and lower border flanges 194, 195. The inner side of the door may be closed by a suitable back panel 196, thereby providing a dead air space inside the door; and the front panel 191 is formed with a forwardly extending portion 197 provided on its lower side with a finger-receiving recess 198. In some embodiments, the doors may comprise only the outer or facing panels. When springs are omitted the doors may be provided with chains.

The shelves may be supported in open position by means of chains 199 (Fig. 7), which have one end attached to a riveted stud 200 (Fig. 11) and the other end attached to the shelf supporting rod 85 of the shelf above it.

Each door is provided on its side flange 192 and 193 with the right-hand and left-hand bearing brackets 201, 202. Each bearing bracket comprises a strip of sheet metal, which is formed with a longitudinally extending retaining lug 202 at its upper end. At its lower end it has a laterally turned stop flange 203. Between its ends it has apertures for rivets 204, 205, which secure the bearing bracket 201 or 202 to the side of the door 190.

Near its lower end and at the lower door corners the bearing bracket has an elongated oval aperture 206, which registers with a similar aperture in the door flanges 192, 193. This oval aperture is seen also in Figs. 14 and 15, which illustrate the action of the door lock.

The liner wall supports right-hand and left-hand trunnion brackets 207 (Fig. 16); and these are secured in place by self-tapping screw bolts 208. Fig. 13 shows the trunnion bracket 207 attached to the right-hand liner wall 47. Each trunnion bracket is provided with an offset 209 adjacent its lower end and with a spacing flange 210 at its extreme lower end for holding the trunnion platform spaced slightly from the liner wall.

The trunnion 212 may consist of a cylindrical tubular member provided with a pair of narrower flanges 213 extending through an aperture in the bracket 207 and riveted outwardly to secure the trunnion, which is open at both ends, and may have a longitudinal slit, being formed of a piece of sheet metal. The trunnion extends into the aperture 206 of the bearing bracket 201 in each case and provides a pivotal mounting for each side of the door.

The trunnion bracket 207 also has a stop flange 214 extending at right angles to its body in the same direction as to the trunnion, and seen in Figs. 13 and 16. The stop flange 214 engages the side of the bearing bracket 201, as shown in Fig. 16, when the door is open. The angular stop flange 203 also engages stop 214 and assures engagement even though inaccuracies of mass production may result in liners which vary in width.

At its upper end the trunnion bracket 207 has an offset 215 extending away from the liner, as shown in Fig. 13; and its upper end has a vertical rectangular slot 216 bordered by a tab 217, which is longer and acts as a stop on the inner side, and by a second tab 218, the rounded upper surface of which acts as a guide.

When the door is to be locked in closed position, it is pivoted upward from the position of Fig. 16 until the lug 202 rides on the rounded surface of tab 218. The elongated aperture 206 permits the trunnions to rise in this aperture until the flange 202 can move over into the slot 216, locking the door in closed position, when flange 202 drops into vertical slot 216.

The door can then be opened by lifting it and pulling it forward from the trunnion position of Fig. 15 to the trunnion position of Fig. 14, during which the locking flange 202 is lifted out of vertical slot 216.

The door may also be provided, if desired, with a spring, indicated at 219. Spring 219 has a diametrical portion 220 extending through an aperture in trunnion 212 and has a coiled portion 221 coiled about the trunnion 212 and provided with an elongated arm 222 inside the door and engaged in a slot 223 in a riveted stud 224. The spring tends to close the door at all times and prevents the possibility of the larger door 52 being closed against a partially open inner door.

Such door arrangements are preferably provided for all of the shelves 60, 61, 62, and 63, pivoted at the shelf level; but the space below the shelf 63 is preferably provided with a suitable drawer 225. This drawer is provided with a forward facing or cover 226, which is similar in shape and construction to the pivoted doors, but which is fixedly secured to the front of the drawer 225.

Drawer 225 is preferably in the form of a basket, the bottom, sides, and back being formed of wires extending transversely to each other and conforming substantially to the shape of the lower part of the liner by reason of the diagonal portion 227 of the basket. Each side of the basket is provided with a guide member 228, comprising a strip of metal having a laterally extending flange 229 for riding upon a roller.

Each guide 228 preferably carries a pivoted roller 230 near its rear end, the top of the roller being substantially flush with the top of the guide flange 229. Each guide carries an angle bracket 231, acting as a stop for limiting the withdrawal of the door or basket beyond an angular stop 232 carried by the slide-ways 233, which are mounted on both sides of the liner.

The slide-ways 233 comprise strips of metal stamped with a protuberance 234 at their forward end for mounting a roller stud 235, which has a reduced end riveted in the slide-way. The roller stud 235 pivotally supports a roller 236, which may be molded of self-lubricating plastic sold under the trade name "nylon." Roller 236 is retained by head 237 and has an enlarged cylindrical head 238.

The slide-ways 233 have an elongated body extending backwardly into the liner in a horizontal direction and are secured at both ends by screw bolts in the apertures 239, which mount the slide-ways on the liner.

The slide-ways have upper and lower horizontal flanges 240, 241, projecting into the liner and forming a channeled opening 242, within which the rollers have their heads 238. The lower flange 231 is slightly turned up at 243 to retain the roller.

The roller 236 on each slide-way engages below the flange 229 on the guides 228 of the basket or drawer. The roller 230 of the basket or drawer engages in the channel 242 of the slide-ways. Rollers 236 engage below the flange 229, holding the drawer up at its forward end. Rollers 230, engaging below flange 240, hold the drawer down at its rear end, when open, and engage flange 243 to support the rear end when the drawer is closed.

Thus the drawer may be pulled out until stop 231 engages stop 232, the rollers still acting to prevent the drawer from tilting.

The drawer, being made of basket form, with wires and open spaces, air may circulate freely about its contents; and as all of the shelves are spaced from the side walls and from the doors, the air may circulate freely between the shelf spaces.

The uppermost shelf 59 is the coldest, as it receives the liquid refrigerant first and may be used for freezing ice cubes; but it is also at the uppermost part of the liner, to which the warmest air tends to move. Thus the entire interior of the cabinet may be maintained at a below zero temperature for freezing food or for maintaining it in frozen condition; and either the upper shelf or the lower drawer may be used as a quick freeze compartment.

The operation of the refrigeration system is substantially as follows: The charge of refrigerant is suitably proportioned to the volumes of the evaporator tubing and condenser tubing, motor housing, and receiver so that all of the evaporator tubing may be cooled to a below zero temperature.

When the temperature of the second shelf 60 rises above the setting of the cold control, the motor compressor starts and draws refrigerant vapor from the receiver 105 and compresses it. The compressed and heated refrigerant in the form of vapor is delivered directly from the compressor to the preliminary cooling condenser, where it is partially condensed and cooled; and the refrigerant is delivered back to the top of the motor housing, where it runs down over the motor parts and is re-vaporized, cooling the motor parts; and the oil is separated to the motor sump, which communicates with the compressor unit through a suitable lower conduit 245, extending from the oil in the sump 162 into the compressor, and communicating with the compressor inlet 247.

The refrigerant under pressure in the motor housing 161 causes the oil in the oil sump to flow toward the inside of the motor compressor, tending to lubricate it.

The refrigerant is taken off the top of the motor housing in a vaporized condition and conducted to the main condenser tubing, which is carried by and is secured by brackets to the inside of the shell. The brackets are elongated angle brackets spot welded to the shell and having slots for the tubing. The heat of the compressed refrigerant is dissipated to the atmosphere by radiation from the shell; and thereafter the liquid refrigerant passes through a drier 246 containing silica gel between screens and through the capillary restrictor 110 to the shelves.

It is carried first to the top shelf and thereafter to the lowermost shelf, and rises thereafter to the rest of the shelves in order from the bottom to the top. From the next to the topmost shelf refrigerant goes to the upper receiver. Refrigerant is pumped from the upper part of the receiver directly to the inlet 247.

Inlet tube 247 passes through the oil sump 162 into the motor compressor 163.

It will thus be observed that I have invented an improved refrigerator of the freezer type, having a vertical door and door opening in which the cooling is effected by means of a plurality of shelves of sheet metal, having tubing integrally welded thereto; and the shelves are removably supported in the side walls and rear wall of the liner.

The heat is dissipated from the refrigerator circuit by a rear preliminary condenser and by a main condenser, which utilizes the sheet metal of the refrigerator cabinet shell. The main condenser coils are arranged close to the breaker strips to eliminate condensation around the door opening.

The present construction is simple and economical and capable of being manufactured at a low cost; but it is, nevertheless, effective in quickly freezing food for storage and in maintaining it in a frozen condition at below zero temperatures.

By spacing the shelves and inner doors from the inner door panel and walls of the liner free circulation of air is secured throughout the entire cabinet so that every part is maintained at a below zero temperature.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a refrigeration system for frozen food storage, the combination of an insulated cabinet having an outer shell and an inner liner separated by insulation, and having a door opening and an insulated door, a motor compressor located at the rear bottom corner of said cabinet and partially housed in a recess in said shell, and including a motor with a motor housing, a compressor carried below the motor and driven thereby, and located in an oil sump below the motor housing, a plurality of evaporator shelves carried by the walls of the liner, and having freezing coils connected in series with each other, a main condenser including said outer shell, and sinuous tubing carried by the sides, back, top, and bottom of the shell on its inside, the said tubing extending forwardly on both sides of the shell and having U-bends located adjacent the door opening, the warm condenser tubing raising the temperature of the shell about the door opening and breaker strips to a point above the dew point to prevent condensation about the door opening, and a pre-cooler condenser carried by the motor compressor behind said cabinet, said compressor having its outlet directly connected to said pre-cooler, said pre-cooler discharging into the top of the motor housing, said motor housing having an upper conduit leading to said main condenser, a capillary tube restrictor extending from said main condenser to said evaporator shelves, and a suction conduit extending from the evaporator shelves to the suction inlet of the compressor.

2. In a refrigeration system for frozen food storage, the combination of an insulated cabinet having an outer shell and an inner liner separated by insulation, and having a door opening and an insulated door, a motor compressor located at the rear bottom corner of said cabinet and partially housed in a recess in said shell, and including a motor with a motor housing, a compressor carried below the motor and driven thereby, and located in an oil sump below the motor housing, a plurality of evaporator shelves carried by the walls of the liner, and having freezing coils connected in series with each other, a main condenser including said outer shell, and sinuous tubing carried by the sides, back, top, and bottom of the shell on its inside, and a pre-cooler condenser carried by the motor compressor behind said cabinet, said compressor having its outlet directly connected to said pre-cooler, said pre-cooler discharging into the top of the motor housing, said motor housing having an upper conduit leading to said main condenser, a capillary tube restrictor extending from said main condenser to said evaporator shelves, and a suction conduit extending from the evaporator shelves to the suction inlet of the compressor, a transverse frame member extending from side to side of the back of said shell, a second transverse frame member extending across said recess and arched about said motor compressor, spring means carried by said motor compressor and supporting the latter on said arched frame member, a vertically extending bar carried by said motor compressor, said pre-cooler comprising a plurality of horizontal passes of tubing joined by vertically extending wires, and substantially U shaped rubber members extending about certain of said coils and anchored in apertures in said bar.

3. In a refrigeration system for frozen food storage, the combination of an insulated cabinet having an outer shell and an inner liner separated by insulation, and having a door opening and an insulated door, a motor compressor located at the rear bottom corner of said cabinet and partially housed in a recess in said shell, and including a motor with a motor housing, a compressor carried below the motor and driven thereby, and located in an oil sump below the motor housing, a plurality of evaporator shelves carried by the walls of the liner, and having freezing coils connected in series with each other, a main condenser including said outer shell, and sinuous tubing carried by the sides, back, top, and bottom of the shell on its inside, the said tubing extending forwardly on both sides of the shell and having U-bends located adjacent the door opening, the warm condenser tubing raising the temperature of the shell about the door opening and breaker strips to a point above the dew point to prevent condensation about the door opening, and a pre-cooler condenser carried by the motor compressor behind said cabinet, said compressor having its outlet directly connected to said pre-cooler, said pre-cooler discharging into the top of the motor housing, said motor housing having an upper conduit leading to said main condenser, a capillary tube restrictor extending from said main condenser to said evaporator shelves, and a suction conduit extending from the evaporator shelves to the suction inlet of the compressor, the uppermost of said shelves receiving refrigerant first, and having a horizontal receiver carried adjacent its rear edge, said uppermost shelf being spaced from the liner top sufficiently to receive ice trays.

4. In a refrigeration system for frozen food storage, the combination of an insulated cabinet having an outer shell and an inner liner separated by insulation, and having a door opening and an insulated door, a motor compressor located at the rear bottom corner of said cabinet and partially housed in a recess in said shell, and including a motor with a motor housing, a compressor carried below the motor and driven thereby, and located in an oil sump below the motor housing, a plurality of evaporator shelves carried by the walls of the liner, and having freezing coils connected in series with each other, a main condenser including said outer shell, and sinuous tubing carried by the sides, back, top, and bottom of the shell on its inside, the said tubing extending forwardly on both sides of the shell and having U-bends located adjacent the door opening, the warm condenser tubing raising the temperature of the shell about the door opening and breaker strips to a point above the dew point to prevent condensation about the door opening, and a pre-cooler condenser carried by the motor compressor behind said cabinet, said compressor having its outlet directly connected to said pre-cooler, said pre-cooler discharging into the top of the motor housing, said motor housing having an upper conduit leading to said main condenser, a capillary tube restrictor extending from said main condenser to said evaporator shelves, and a suction conduit extending from the evaporator shelves to the suction inlet of the compressor, the uppermost of said shelves receiving refrigerant first, and having a horizontal receiver carried adjacent its rear edge, said uppermost shelf being spaced from the liner top sufficiently to receive ice trays, the said capillary tubing being connected to the top shelf tubing, which is thereafter connected to the bottom shelf tubing, and the shelf tubing being thereafter connected in regular order from the bottom upward in series to the top receiver.

5. In a refrigeration system for frozen food storage, the combination of an insulated cabinet having an outer shell and an inner liner separated by insulation, and having a door opening and an insulated door, a motor compressor located at the rear bottom corner of said cabinet and partially housed in a recess in said shell, and including a motor with a motor housing, a compressor carried below the motor and driven thereby, and located in an oil sump below the motor housing, a plurality of evaporator shelves carried by the walls of the liner, and having freezing coils connected in series with each other, a main condenser including said outer shell, and sinuous tubing carried by the sides, back, top, and bottom of the shell on its inside, and a pre-cooler condenser carried by the motor compressor behind said cabinet, said compressor having its outlet directly connected to said pre-cooler, said pre-cooler discharging into the top of the motor housing, said motor housing having an upper conduit leading to said main condenser, a capillary tube restrictor extending from said main condenser to said evaporator shelves, and a suction conduit extending from the evaporator shelves to the suction inlet of the compressor, the uppermost of said shelves receiving refrigerant first, and having a horizontal receiver carried adjacent its rear edge, said uppermost shelf being spaced from the liner top sufficiently to receive ice trays, the said capillary tubing being connected to the top shelf tubing, which is thereafter connected to the bottom shelf tubing, and the shelf tubing being thereafter connected in regular order from the bottom upward in series to the top receiver, the said suction conduit communicating with said receiver at the top of the receiver.

6. A shelf assembly for vertical freezer cabinets, comprising a liner having a back wall and two side walls, said back wall having two spaced apertures near the side walls, and said side walls each having an aperture near the liner front edge, all said apertures being in the same horizontal plane, resilient grommets in said apertures, having central bores, a rectangular sheet metal shelf having sinuous refrigerant tubing secured to its lower side, and a rod carried by the shelf lower side along the rear edge of the shelf, and having its ends bent rearwardly, and extending into the bores of the grommets in the rear liner wall, a front rod extending from side to side of the liner, and having its ends supported in the side wall grommets, said shelf resting with its bottom on said front rod, and said shelf having a front depending face flange in front of said front rod.

7. A shelf assembly for vertical freezer cabinets, comprising a liner having a back wall and two side walls, said back wall having two spaced apertures near the side walls, and said side walls each having an aperture near the liner front edge, all said apertures being in the same horizontal plane, resilient grommets in said apertures, having central bores, a rectangular sheet metal shelf having sinuous refrigerant tubing secured to its lower side, a rod carried by the shelf lower side along the rear edge of the shelf, and having its ends bent rearwardly, and extending into the bores of the grommets in the rear liner wall, a front rod extending from side to side of the liner, and having its ends supported in the side wall grommets, said shelf resting with its bottom on said front rod, and said shelf having a front depending face flange in front of said front rod, said shelf having lateral depending flanges recessed to pass said front rod, and said face flange carrying a rearwardly extending retaining flange under said front rod.

8. A shelf assembly for vertical freezer cabinets, comprising a liner having a back wall and two side walls, said back wall having two spaced apertures near the side walls, and said side walls each having an aperture near the liner front edge, all said apertures being in the same horizontal plane, resilient grommets in said apertures, having central bores, a rectangular sheet metal shelf having sinuous refrigerant tubing secured to its lower side, a rod carried by the shelf lower side along the rear edge of the shelf, and having its ends bent rearwardly and extending into the bores of the grommets in the rear liner wall, a front rod extending from side to side of the liner, and having its ends supported in the side wall grommets, said shelf resting with its bottom on said front rod, and said shelf having a front depending face flange in front of said front rod, said shelf having lateral depending flanges recessed to pass said front rod, and said face flange carrying a rearwardly extending retaining flange under said front rod, said lateral depending flanges being slit behind said rod below the shelf body to form bendable tabs, preventing forward movement of said shelf on said front rod.

References Cited in the file of this patent
UNITED STATES PATENTS

| Number | Name | Date |
|---|---|---|
| 1,170,065 | Hirschman | Feb. 1, 1916 |
| 1,876,596 | Belding | Sept. 13, 1932 |
| 1,951,231 | Antrim et al. | Mar. 13, 1934 |
| 2,118,659 | Sywert | May 24, 1938 |
| 2,222,201 | Ito | Nov. 19, 1940 |
| 2,327,672 | Schweller | Aug. 24, 1943 |
| 2,381,598 | Jones | Aug. 7, 1945 |
| 2,399,967 | West et al. | May 7, 1946 |
| 2,459,311 | Jarlais | Jan. 18, 1949 |
| 2,509,011 | Moore | May 23, 1950 |
| 2,509,611 | Phillip | May 30, 1950 |
| 2,509,613 | Phillip | May 30, 1950 |
| 2,511,127 | Phillip | June 13, 1950 |
| 2,571,600 | Nave | Oct. 16, 1951 |
| 2,613,510 | Morton | Oct. 14, 1952 |
| 2,620,255 | Beckett | Dec. 2, 1952 |
| 2,622,412 | Staebler | Dec. 23, 1952 |
| 2,676,864 | Townsend | Apr. 27, 1954 |

FOREIGN PATENTS

| Number | Country | Date |
|---|---|---|
| 619,884 | Great Britain | Mar. 16, 1949 |